US012120119B2

(12) United States Patent
Betti et al.

(10) Patent No.: US 12,120,119 B2
(45) Date of Patent: Oct. 15, 2024

(54) METHOD AND SYSTEM FOR RETRIEVING USER INFORMATION IN EVOLVED PACKET SYSTEM

(71) Applicant: TELECOM ITALIA S.p.A., Milan (IT)

(72) Inventors: Alessandro Betti, Rome (IT); Vito Curcuru', Rome (IT); Fabio Mazzoli, Rome (IT); Patricia Scognamiglio, Rome (IT)

(73) Assignee: TELECOM ITALIA S.p.A., Milan (IT)

( * ) Notice: Subject to any disclaimer, the term of this patent is extended or adjusted under 35 U.S.C. 154(b) by 456 days.

(21) Appl. No.: 17/311,805

(22) PCT Filed: Dec. 18, 2019

(86) PCT No.: PCT/EP2019/085898
§ 371 (c)(1),
(2) Date: Jun. 8, 2021

(87) PCT Pub. No.: WO2020/127450
PCT Pub. Date: Jun. 25, 2020

(65) Prior Publication Data
US 2022/0029995 A1 Jan. 27, 2022

(30) Foreign Application Priority Data
Dec. 20, 2018 (IT) .................... 102018000020479

(51) Int. Cl.
*H04L 29/06* (2006.01)
*H04L 9/40* (2022.01)
*H04L 67/51* (2022.01)

(52) U.S. Cl.
CPC ...... *H04L 63/0892* (2013.01); *H04L 63/0236* (2013.01); *H04L 67/51* (2022.05)

(58) Field of Classification Search
CPC ......... H04L 67/56; H04L 67/51; H04L 12/66; H04L 63/0892; H04L 63/0236
See application file for complete search history.

(56) References Cited

U.S. PATENT DOCUMENTS

2004/0260816 A1* 12/2004 Skog ................... H04L 61/5084
709/227
2015/0103780 A1* 4/2015 Kaippallimalil .... H04L 61/4588
370/328
(Continued)

OTHER PUBLICATIONS

International Search Report and Written Opinion issued Feb. 6, 2020 in PCT/EP2019/085898 filed Dec. 18, 2019.

*Primary Examiner* — Dao Q Ho
(74) *Attorney, Agent, or Firm* — Oblon, McClelland, Maier & Neustadt, L.L.P.

(57) ABSTRACT

A method for managing an Evolved Packet System is provided. The Evolved Packet System comprises a core network including a database configured to store User Identifying Information of user devices attached to the Evolved Packet System, and at least one external server. The method comprises having a user device attached to the Evolved Packet System request IP services to the external server; in response to said requesting IP services, having the external server request the User Identifying Information of said user device to the core network; in response to said requesting the User Identifying Information, having the core network access the database and retrieve the User Identifying Information of said user device; having the core network send the retrieved User Identifying Information to the external server; having the external server provide the requested IP services to the user device by exploiting said retrieved User Identifying Information.

15 Claims, 4 Drawing Sheets

(56) References Cited

U.S. PATENT DOCUMENTS

| | | | |
|---|---|---|---|
| 2015/0195771 A1* | 7/2015 | Hurtta | H04W 48/14 |
| | | | 370/338 |
| 2016/0360458 A1* | 12/2016 | Lubenski | H04W 76/22 |
| 2016/0381699 A1* | 12/2016 | Rubin | H04W 36/02 |
| | | | 370/329 |
| 2018/0084021 A1 | 3/2018 | Rubin et al. | |
| 2019/0253469 A1 | 8/2019 | Rubin et al. | |
| 2019/0342929 A1 | 11/2019 | Lubenski | |

* cited by examiner

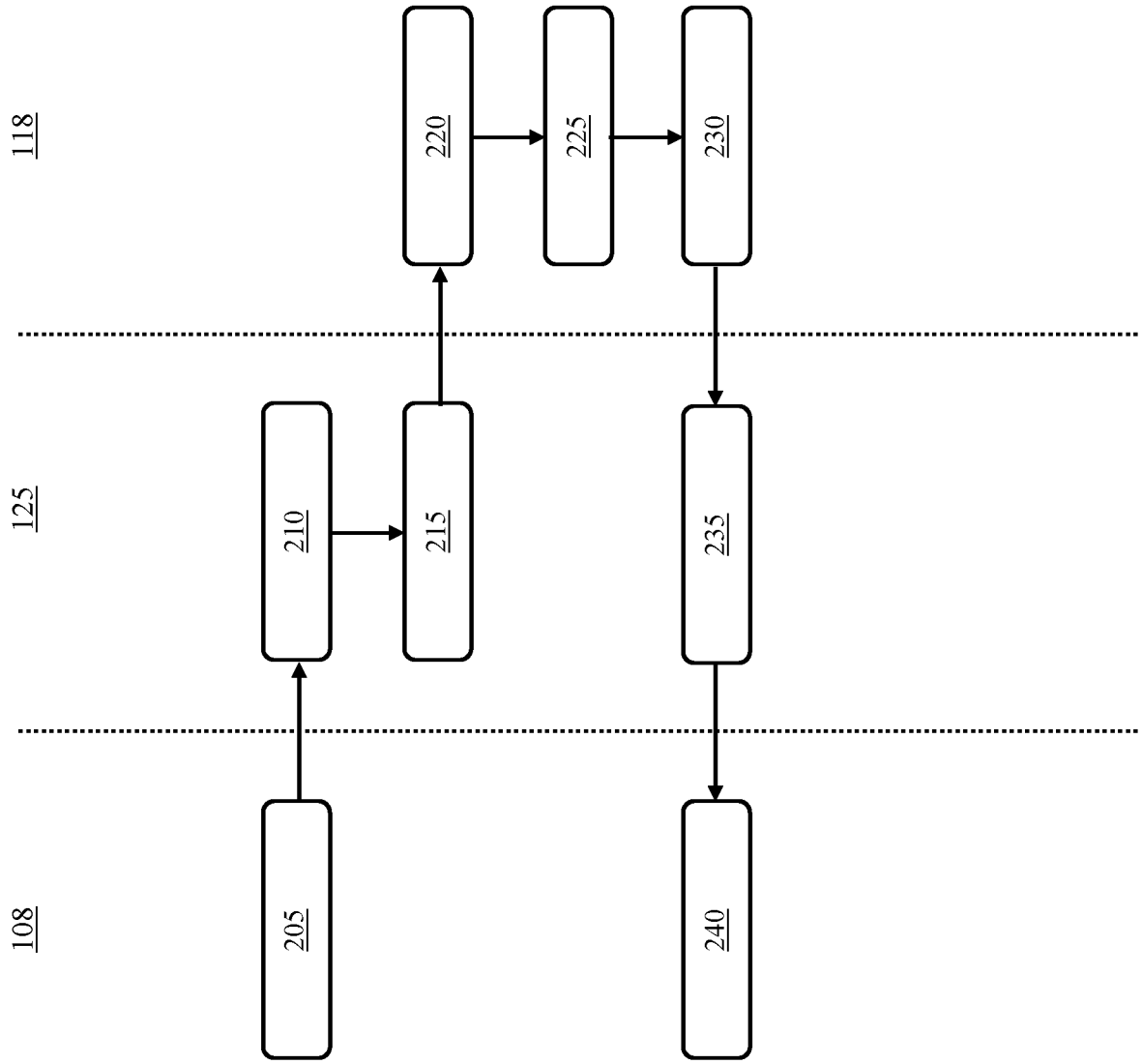

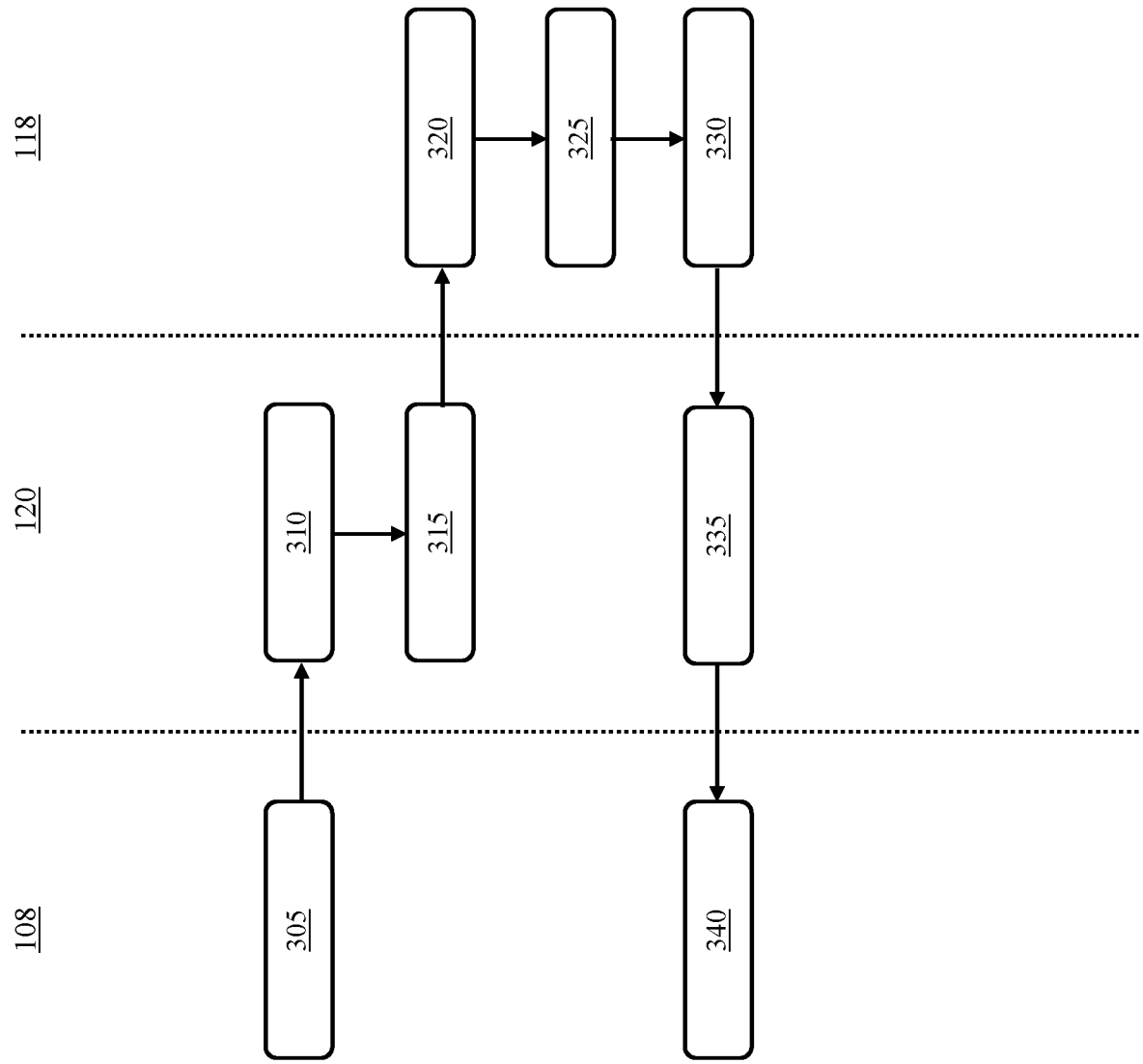

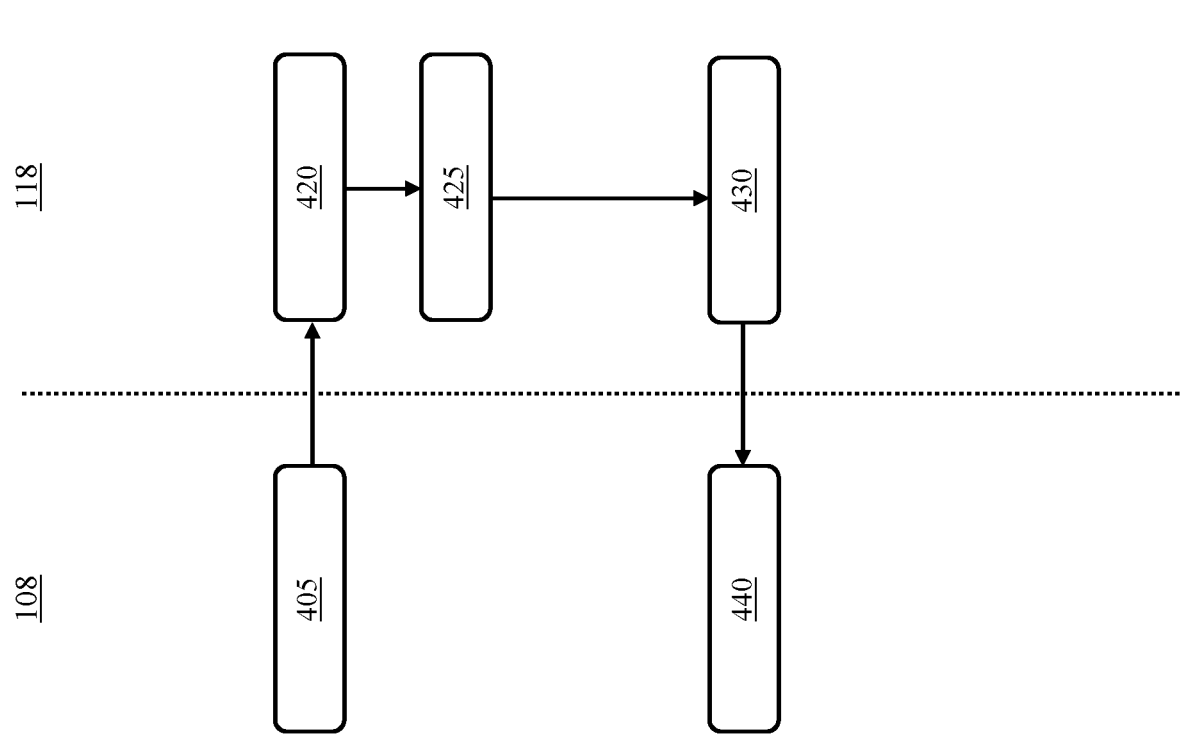

METHOD AND SYSTEM FOR RETRIEVING USER INFORMATION IN EVOLVED PACKET SYSTEM

BACKGROUND OF THE INVENTION

Field of the Invention

The present invention generally relates to a communication system comprising an IP subsystem for accessing external servers. More particularly, the present invention relates to a method and a system for allowing external servers to retrieve user information about users on the communication system.

Overview of the Related Art

International standardization bodies like 3GPP (www.3gpp.org), GSMA (www.gsma.org) and OMA ("Open Mobile Alliance") define attach procedures for allowing User Devices ("UD") to attach to a communication system, such as an Evolved Packet System ("EPS") network, for data connectivity. Through said attach procedures, a UD establishes a Default Bearer/Primary Packed Data Protocol ("PDP") context per Access Point Name ("APN") which is able to provide a basic data connectivity.

UDs attached to the EPS network may require the connection to an external server (e.g., a multimedia external server) for availing of Internet Protocol ("IP") services (e.g., IP multimedia services). External servers receive from the UDs only the IP address thereof. However, in order to provide the requested IP services to the UDs, the external servers require additional user identifying information which allows external servers to trace back the identity of the UDs. In addition to the IP, the required user identifying information may for example comprise the Mobile Station International Subscriber Directory Number ("MSISDN") and the International Mobile Subscriber Identity ("IMSI").

The user identifying information of the UDs is usual stored in proper internal databases of the core network. Making for example reference to an EPS based on a 4G architecture, user identifying information may be stored in a database internal to the Packet Data Network Gateway ("PGW").

According to known solutions, the user identifying information corresponding to a generic UD is sent to the external server each time such UD carries out an attach procedure to the EPS. More specifically, during an attach procedure of a UD, the core network interacts with an Authentication, Authorization and Accounting ("AAA") server included in an IP subsystem of the EPS; the AAA server forwards the user identifying information to the external servers.

US patent application US2017134957 discloses a method which includes receiving information for network traffic in a wireless network; correlating the information with a subscriber of a plurality of subscribers; and generating a behaviour profile for the subscriber based on the information over a period of time.

US patent application US2004260816 discloses a system and method for providing access to an IP number or a subscriber identity number associated with a mobile device in a network. The method comprises associating a mobile device with a subscriber identity number; generating a temporary IP number for the mobile device; linking the subscriber identity number with the temporary IP number; storing the subscriber identity number and the temporary IP number in a database; and providing a pull application program interface to extract from the database either the subscriber identity number or the IP address for mobile device when requested by an application program.

PCT patent application WO2014/116464 provides methods, systems and computer readable media for using a Diameter routing agent (DRA) to obtain mappings between mobile subscriber identification information and dynamically assigned Internet protocol (IP) addresses and for making the mappings accessible to applications. One exemplary method includes, at a DRA, receiving a Diameter message containing a dynamically assigned IP address and mobile subscriber identification information. The method further includes routing the received Diameter signaling message. The method further includes copying, by the DRA, the IP address and the mobile subscriber identifier from the message. The method further includes making a mapping between the dynamically assigned IP address and the subscriber identification information accessible to applications.

SUMMARY OF INVENTION

The Applicant has found that the known solutions described above for forwarding user identifying information to external servers are not efficient, because they are affected by a main drawback.

Indeed, the known solutions provide for triggering the sending of user identifying information to the external servers every time a UD is carrying out an attaching procedure, even when the UD is not requesting any service from said external servers. This causes an unnecessary increase of the signaling traffic that may affect the capacity of a telecommunication network in terms of load to be managed (which involves an oversizing of network equipment, and hence high costs of the network infrastructure), as well as the residual data traffic available for the UD.

Another drawback that affects the known solutions relates to the scarce reliability of the user identifying information received by the external servers. Indeed, since according to the known solutions the external servers simply receive the user identifying information every time a UD is carrying out an attaching procedure, the external servers are not aware of possible transmission failures. Therefore, if new user identifying information are not properly sent to an external server during an attaching procedure (because of some transmission failure), the external server results to be in possession of obsolete user identifying information without being aware of that.

In view of the above, the Applicant has devised a solution for reducing the signaling traffic and at the same time increase the reliability of user identifying information received by the external servers.

In very general terms, the solutions according to embodiments of the present invention provide for managing the transmission to the external server of user identifying information corresponding to a specific user device conditioned to a dedicated request carried out by the external server (this dedicated request being carried out when said specific user device is requesting IP services to said external server).

One or more aspects of the present invention are set out in the independent claims, with advantageous features of the same invention that are indicated in the dependent claims, whose wording is enclosed herein verbatim by reference (with any advantageous feature being provided with reference to a specific aspect of the present invention that applies mutatis mutandis to any other aspect).

More specifically, an aspect of the present invention relates to a method for managing an Evolved Packet System.

According to an embodiment of the present invention, the Evolved Packet System comprises a core network including a database configured to store User Identifying Information of user devices attached to the Evolved Packet System.

According to an embodiment of the present invention, the Evolved Packet System comprises at least one external server.

According to an embodiment of the present invention, the method comprises having a user device attached to the Evolved Packet System request IP services to the external server.

According to an embodiment of the present invention, the method comprises, in response to said requesting IP services, having the external server request the User Identifying Information of said user device to the core network.

According to an embodiment of the present invention, the method comprises, in response to said requesting the User Identifying Information, having the core network access the database and retrieve the User Identifying Information of said user device.

According to an embodiment of the present invention, the method comprises having the core network send the retrieved User Identifying Information to the external server.

According to an embodiment of the present invention, the method comprises having the external server provide the requested IP services to the user device by exploiting said retrieved User Identifying Information.

According to an embodiment of the present invention, said requesting the User Identifying Information to the core network comprises requesting said User Identifying Information to a gateway module of the core network configured to provide connectivity between user devices and the external server.

According to an embodiment of the present invention, said sending the retrieved User Identifying Information to the external server comprises having said gateway module send the retrieved User Identifying Information to the external server.

According to an embodiment of the present invention, said requesting the User Identifying Information to the gateway module and said sending the retrieved User Identifying Information to the external server comprises enriching, with additional information, signaling messages transmitted over interfaces of the Evolved Packet System between said gateway module and the external server.

According to an embodiment of the present invention, said Evolved Packet System further comprises a policy management module.

According to an embodiment of the present invention, said requesting the User Identifying Information to the gateway module comprises having the policy management module send a request to the gateway module in the form of additional data enriching signaling messages over a Gx interface.

According to an embodiment of the present invention, said sending the retrieved User Identifying Information to the external server comprises having the gateway module send a reply to the policy management module in the form of additional data enriching signaling messages over said Gx interface.

According to an embodiment of the present invention, said Evolved Packet System further comprises an Authentication, Authorization and Accounting server.

According to an embodiment of the present invention, said requesting the User Identifying Information to the gateway module comprises having the Authentication, Authorization and Accounting server send a request to the gateway module in the form of additional data enriching signaling messages over a SGi interface.

According to an embodiment of the present invention, said sending the retrieved User Identifying Information to the external server comprises having the gateway module send a reply to the Authentication, Authorization and Accounting server in the form of additional data enriching signaling messages over said SGi interface.

According to an embodiment of the present invention, said requesting the User Identifying Information to the gateway module comprises having the external server send a request to the gateway module in the form of additional data enriching signaling messages over an interface, particularly a SGi interface.

According to an embodiment of the present invention, said sending the retrieved User Identifying Information to the external server comprises having the gateway module send a reply to the external server in the form of additional data enriching signaling messages over said interface, particularly said SGi interface.

According to an embodiment of the present invention, said sending a request in the form of additional data enriching signaling messages comprises sending said request by enriching with additional data Re-Auth-Request messages transmitted using DIAMETER protocol.

According to an embodiment of the present invention, said sending a reply in the form of additional data enriching signaling messages comprises sending said reply by enriching with additional data Re-Auth-Answer messages transmitted using DIAMETER protocol.

According to an embodiment of the present invention, said sending a request in the form of additional data enriching signaling messages comprises sending said request by enriching with additional data Change of Authorization messages transmitted using RADIUS protocol.

According to an embodiment of the present invention, said sending a reply in the form of additional data enriching signaling messages comprises sending said reply by enriching with additional data Change of Authorization messages transmitted using RADIUS protocol.

According to an embodiment of the present invention, said core network is based on a selected one among the following architectures:

2G;
3G;
4G/LTE;
5G.

According to an embodiment of the present invention, said User Identifying Information comprise MSISDN and IMSI of said user device.

According to an embodiment of the present invention, said User Identifying Information comprise IMEI of said user device.

According to an alternative embodiment of the present invention, said User Identifying Information further comprise IP address of said user device.

Another aspect of the present invention relates to a method of providing IP services to a user device attached to an Evolved Packet System.

According to an embodiment of the present invention, the Evolved Packet System comprises a core network including a database configured to store User Identifying Information of user devices attached to the Evolved Packet System.

According to an embodiment of the present invention, the Evolved Packet System further comprises at least one external server configured to provide IP services.

According to an embodiment of the present invention, the method comprises having the user device attached to the Evolved Packet System request IP services to the external server.

According to an embodiment of the present invention, the method comprises, in response to said requesting IP services, having the external server request the User Identifying Information of said user device to the core network;

According to an embodiment of the present invention, the method comprises, in response to said requesting the User Identifying Information, having the core network access the database and retrieve the User Identifying Information of said user device.

According to an embodiment of the present invention, the method comprises having the core network send the retrieved User Identifying Information to the external server.

According to an embodiment of the present invention, the method comprises having the external server provide the requested IP services to the user device by exploiting said retrieved User Identifying Information.

Another aspect of the present invention relates to an Evolved Packet System.

According to an embodiment of the present invention, the Evolved Packet System comprises a core network including a database configured to store User Identifying Information of user devices attached to the Evolved Packet System.

According to an embodiment of the present invention, the Evolved Packet System comprises at least one external server.

According to an embodiment of the present invention, the external server is configured to request to the core network the User Identifying Information of a user device attached to the Evolved Packet System that is requesting IP services to the external server.

According to an embodiment of the present invention, the core network is configured to access the database, retrieve the User Identifying Information of said user device, and send the retrieved User Identifying Information to the external server in response to said request.

According to an embodiment of the present invention, the external server is further configured to provide the requested IP services to the user device by exploiting said retrieved User Identifying Information.

According to an embodiment of the present invention, the Evolved Packet System further comprises a gateway module at the core network.

According to an embodiment of the present invention, the gateway module is configured to provide connectivity between user devices and the external server.

According to an embodiment of the present invention, the external server is configured to request the User Identifying Information to the gateway module.

According to an embodiment of the present invention, the gateway module is configured to send the retrieved User Identifying Information to the external server.

According to an embodiment of the present invention, said database is located at the gateway module.

BRIEF DESCRIPTION OF THE ANNEXED DRAWINGS

These and other features and advantages of the present invention will be made apparent by the following description of some exemplary and non-limitative embodiments thereof; for its better intelligibility, the following description should be read making reference to the attached drawings, wherein:

FIG. 2 shows a swim-lane activity diagram of a method implemented by the EPS system of FIG. 1 for providing user identifying information to an external server according a first embodiment of the present invention;

FIG. 3 shows a swim-lane activity diagram of a method implemented by the EPS system of FIG. 1 for providing user identifying information to an external server according a second embodiment of the present invention;

FIG. 4 shows a swim-lane activity diagram of a method implemented by the EPS system of FIG. 1 for providing user identifying information to an external server according a third embodiment of the present invention.

DETAILED DESCRIPTION OF PREFERRED EMBODIMENTS OF THE INVENTION

Figure 1:
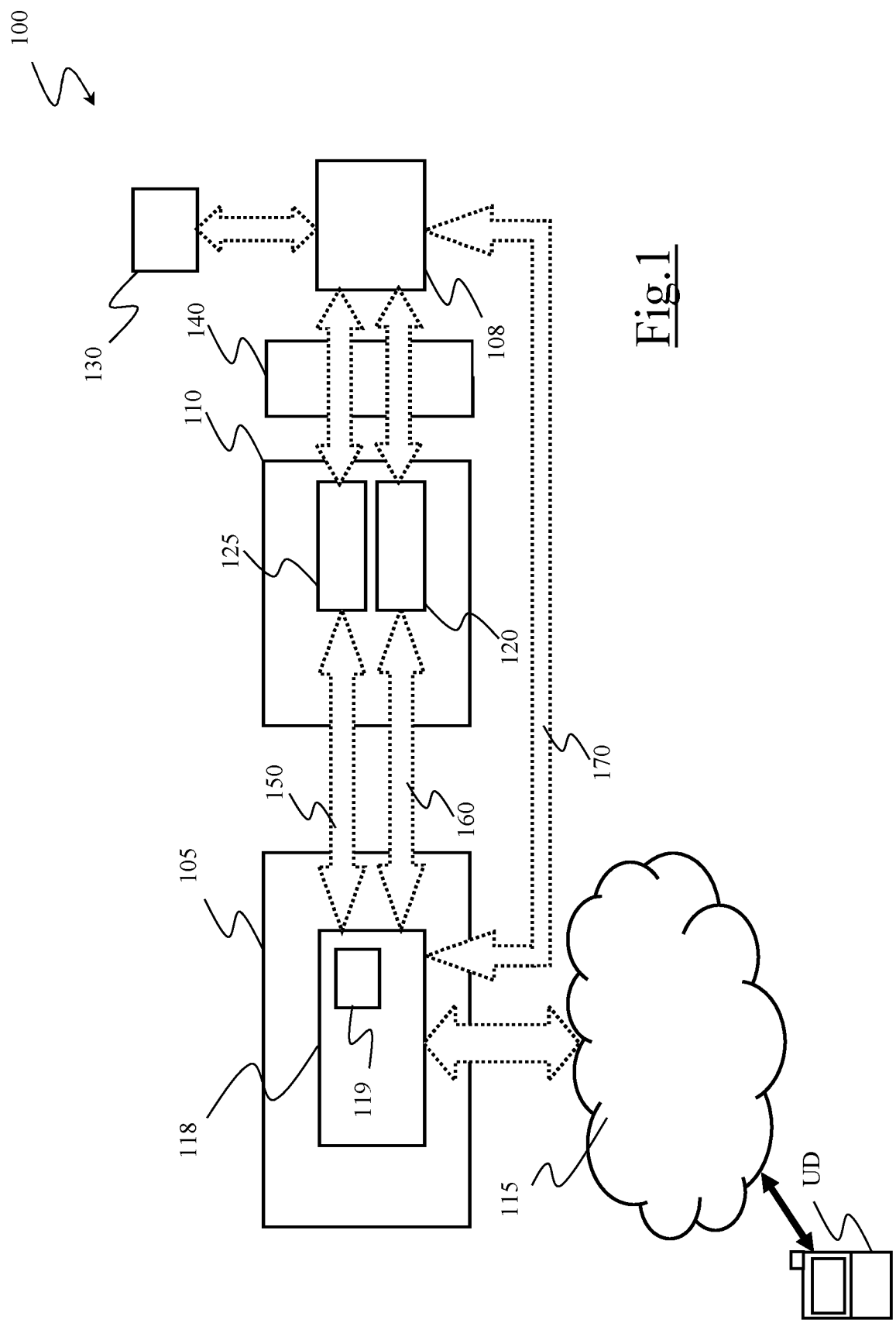
FIG. 1 shows a basic architecture of an Evolved Packet System according to an embodiment of the present invention.

FIG. 1 shows a basic architecture of an Evolved Packet System (EPS) 100 according to an embodiment of the present invention. In the following, only components of the EPS system 100 that are relevant for the understanding of the present invention will be shown and discussed.

The EPS system 100 comprises a core network. The core network is for example the core network of the LTE/4G system (or Evolved Packet Core, described in the 3GPP Technical Specification TS 23.002), and will be referred to as EPC network 105 in the following.

The EPS system 100 also comprises at least one external server 108 (only one illustrated in figure) hosting software applications for providing IP services (e.g., multimedia services).

The EPC network 105 is connected to the external server 108 through an IP subsystem 110 of the EPS system 100. By IP subsystem 110 it is meant an architectural framework for orchestrating (i.e., arranging or managing or handling) the delivering of IP data services (e.g., multimedia service) provided by the external server 108 to user devices UD attached to the EPS system 100.

For the purposes of the present disclosure, a user device UD is an electronic device (including for example a mobile phone or smartphone, a personal digital assistants (PDA) or a computer) external to the EPS system 100, configured to access and enjoy IP data services provided by the external server 108 by connection to the EPS system 100 (and, particularly, to the IP subsystem 110).

Preferably, the user device UD is capable of accessing the IP services through a Radio Access Technology ("RAT" technology). Examples of RAT technologies are Bluetooth, Wi-Fi, 3G, 4G/LTE or 5G. The user device UD is connected to the EPC network 105 through a radio access network 115, such as for example a 4G/LTE radio access network comprising one or more base stations, e.g., Evolved NodeBs (eNodeBs).

For the purposes of the present disclosure, the EPS system 100 preferably comprises the following modules (the term "module" being herein intended to emphasize functional (rather than implementation) aspects thereof, since each module may be implemented by software, hardware, and/or a combination thereof, and the modules may also reflect, at least conceptually, the physical structure of the EPS system 100):

Packet Data Network Gateway ("PGW") module 118.
  The PGW module 118 is included in the EPC network 105 and is configured to provide connectivity between user devices UD and the external server 108 by receiving/sending data traffic from/to user devices UD attached to the EPS system 100 through the radio access network 115. The PGW module 118 further comprises a database 119 configured to store User Identifying Information ("UII") comprising the IPs assigned by EPC network 105 to the user devices UD attached to the EPS system 100, as well as, for example, their MSISDN and IMSI.

Authentication, Authorization and Accounting ("AAA") server 120. The AAA server 120 and the related interfaces are included in the IP subsystem 110 (as described in the 3GPP Technical Specifications TS 29.273 and TS 29.061). The AAA server 120 interacts with the PGW module 118 when a user device UD is carrying out an attach procedure to the EPS system 100 for exchanging UII comprising the IP, MSISDN and IMSI of said user device UD.

Policy Control and Charging Rules Function ("PCRF") module 125. The PCRF module 125 and the related interfaces are included in the IP subsystem 110 (as described in the 3GPP Technical Specifications TS 23.203, TS 29.212 and TS 29.214). The PCRF module 125 is configured to carry out policy control decision making procedures, and to control flow-based charging functionalities in the (not illustrated) Policy Control Enforcement Function module ("PCEF") of the PGW module 118.

IP resolver server 130. The IP resolver server 130 is configured to host software applications directed to allow the external server 108 to check for changes in the IP of the user device UD.

Service Exposure module 140. The service Exposure module 140 hosts software applications for the safely exposure of network interfaces on the web.

Gx interface 150. The Gx interface 150 is an interface between the PGW module 118 and the PCRF module 125, which allows the direct control of the PCRF module 125 over policy enforcement functions of the PGW module 118. The protocol used on the Gx interface 150 is the DIAMETER protocol partly defined in the 3GPP Technical specification TS 29.212.

SGi interface 160. The SGi interface 160 is an IP based interface between the PGW module 118 and the AAA server 120. The protocols used on the SGi interface 160 are the RADIUS protocol and/or the DIAMETER protocol partly defined in the 3GPP Technical specification TS 29.061.

According to an embodiment of the present invention, the EPS system 100 may further comprise an (optional) SGi interface 170, which is a direct IP based interface between the PGW module 118 and the external server 108. As it will be described in detail in the following of the present description, the SGi interface 170 may be advantageously exploited for direct queries coming from the external server 108 and directed to the PGW module 118.

In general terms, the solutions according to embodiments of the present invention provide for managing the transmission to the external server 108 of the UII corresponding to a specific user device UD attached to the EPS system 100 only in response to a dedicated request carried out by the external server 108 to the EPC network 105 when said specific user device UD is requesting IP services to said external server 108.

According to embodiments of the present invention, the requests of UII carried out by the external server 108 to the PGW module 118 are forwarded by exploiting (e.g., enriching) signaling messages that are usually transmitted over interfaces of the EPS system 100—such as the Gx interface 150, the SGi interface 160, or the SGi interface 170.

Similarly, according to an embodiment of the present invention, the requested UII are forwarded to the external server 108 by exploiting (e.g., enriching) signaling messages that are usually transmitted over interfaces of the EPS system 100—such as the Gx interface 150, the SGi interface 160, or the SGi interface 170.

FIG. 2 shows a swim-lane activity diagram of a method 200 implemented by the EPS system 100 for providing to the external server 108 UII corresponding to a user device UD requesting IP services to the external server 108, according to a first embodiment of the present invention.

According to this embodiment of the present invention, the external server 108 and the PGW module 118 are configured to exchange requests of UII (and the UII itself) by means of additional information that enrich signalling messages over the Gx interface 150 between the PCRF module 125 and the PGW module 118 defined in the 3GPP Technical specifications TS 29.212, TS 29.210, TS 29.213, TS 23.203, and in the Internet Engineering Task Force ("IETF") RFC 3588 and IETF RFC 4006.

The method 200 according to this first embodiment of the present invention provides for the external server 108 sending a request to the PGW module 118 through the PCRF module 125.

The method 200 starts at the action block 205, where, in response to a request of IP services to the external server 108 by a specific user device UD attached to the EPS system 100, the external server 108 forwards to the PCRF module 125 a UII acquisition request REQ directed to the acquisition of the UII of said user device UD. The interface between the external server 108 and the PCRF module 125 is out of the scope of the present invention, and could be based on standard protocols, such as HyperText Transfer Protocol ("HTTP"), Lightweight Directory Access Protocol ("LDAP"), or others. The request REQ comprises:

a flag A(PCRF) to inform the PCRF module 125 to operate following a UII request procedure, and
the IP address IP(UD) of the user device UD that has made the request of IP services.

At the action block 210, the PCRF module 125 receives and analyzes the request REQ. In response to the received flag A(PCRF), the PCRF module 125 forwards a UII acquisition request REQ' to the PGW module 118 (action block 215). The request REQ' comprises:

a flag A(PGW) to inform the PGW module 118 to operate following a UII request procedure, and
the IP address IP(UD) of the user device UD that has made the request of IP services.

According to an embodiment of the present invention, the request REQ' is sent by the PCRF module 125 in the form of additional information that enriches the Re-Auth-Request (RAR) messages sent from the PCRF module 125 to the PGW module 118 over the Gx interface 150, e.g., for Session Update, Session Termination.

According to an embodiment of the present invention, a specific Attribute-Value Pair ("AVP") of the RAR message may be used for the transmission of the flag A(PGW), such as the (standard-defined) Event-Trigger AVP. Alternatively, a new dedicated AVP of the RAR message can be used.

According to an embodiment of the present invention, the IP address IP(UD) of the user device UD is sent by adding to the RAR message the UE-Local-IP-Address AVP which is usually employed by the Credit-Control-Request messages according to the known solutions. The UE-Local-IP-Address AVP is a good candidate to be used for sending the IP address IP(UD), because, according to the known solutions, said AVP is already used for transporting IP addresses, although in the opposite direction (i.e., from the PGW to the PCRF). Alternatively, a new dedicated AVP of the RAR message can be used.

An exemplary RAR message enriched with the flag A(PGW) and the IP address IP(UD) of the request REQ' according to an embodiment of the present invention is reported hereinbelow, wherein the AVPs corresponding to the enriched portions of the RAR message are marked in bold.

```
<RA-Request> ::= < Diameter Header: 258, REQ, PXY >
      < Session-Id >
      [ DRMP ]
      { Auth-Application-Id }
      { Origin-Host }
      { Origin-Realm }
      { Destination-Realm }
      { Destination-Host }
      { Re-Auth-Request-Type }
      [ Session-Release-Cause ]
      [ Origin-State-Id ]
      [ OC-Supported-Features ]
     *[ Event-Trigger ]            -> flag A(PGW)
      [ Event-Report-Indication ]
     *[ Charging-Rule-Remove ]
     *[ Charging-Rule-Install ]
      [ Default-EPS-Bearer-QoS ]
     *[ QoS-Information ]
      [ Default-QoS-Information ]
      [ Revalidation-Time ]
     *[ Usage-Monitoring-Information ]
      [ PCSCF-Restoration-Indication ]
    0*4[ Conditional-Policy-Information ]
      [ Removal-Of-Access ]
      [ IP-CAN-Type ]
      [ PRA-Install ]
      [ PRA-Remove ]
     *[ CSG-Information-Reporting ]
     *[ Proxy-Info ]
     *[ Route-Record ]
      [ UE-Local-IP-Address ]   -> IP address IP(UD)
     *[ AVP ]
```

At action block 220, the PGW module 118 receives and analyses the request REQ'.

In response to the received flag A(PGW), the PGW module 118 accesses the database 119 using the IP address IP(UD) as a search key so as to retrieve the UII corresponding to the user device UD that has made the request of IP services (action block 225).

If the requested UII is not stored in the database 119, the PGW module 118 replies with an error message (not illustrated in figure).

If the UII—comprising for example IP, MSISDN and IMSI—is retrieved from the database 119, the PGW module 118 forwards to the PCRF module 125 a response RSP comprising the retrieved UII (action block 230).

According to an embodiment of the present invention, the response RSP is sent by the PGW module 118 in the form of additional information that enriches the Re-Auth-Answer (RAA) messages sent from the PGW module 118 to the PCRF module 125 over the Gx interface 150, e.g., for Session Update, Session Termination.

According to an embodiment of the present invention, the UII comprised in the response RSP is sent by adding to the RAA message the (standard-defined) Subscription-Id AVP which is usually employed by the Credit-Control-Request messages according to the known solutions. In this case, two instances of the Subscription-Id AVP are needed to transport both the MSISDN and IMSI. Alternatively, a new dedicated AVP of the RAA message can be used.

An exemplary RAA message enriched with the UII of the response RSP according to an embodiment of the present invention is reported hereinbelow, wherein the AVP corresponding to the enriched portion of the RAA message is marked in bold.

```
<RA-Answer> ::= < Diameter Header: 258, PXY >
      < Session-Id >
      [ DRMP ]
      { Origin-Host }
      { Origin-Realm }
      [ Result-Code ]
      [ Experimental-Result ]
      [ Origin-State-Id ]
      [ OC-Supported-Features ]
      [ OC-OLR ]
      [ IP-CAN-Type ]
      [ RAT-Type ]
      [ AN-Trusted ]
    0*2 [ AN-GW-Address ]
      [ 3GPP-SGSN-MCC-MNC ]
      [ 3GPP-SGSN-Address ]
      [ 3GPP-SGSN-Ipv6-Address ]
      [ RAI ]
      [ 3GPP-User-Location-Info ]
      [ User-Location-Info-Time ]
      [ NetLoc-Access-Support ]
      [ User-CSG-Information ]
      [ 3GPP-MS-TimeZone ]
      [ Default-QoS-Information ]
     *[ Charging-Rule-Report]
      [ Error-Message ]
      [ Error-Reporting-Host ]
      [ Failed-AVP ]
     *[ Proxy-Info ]
      [ Subscription-Id]     -> UII(MSISDN, IMSI)
     *[ AVP ]
```

Once the response RSP is received and analysed by the PCRF module 125, the PCRF module 125 forwards a response RSP' to the external server 108 comprising the retrieved UII (action block 235).

Then, the external server 108 retrieves from the received response RSP' the requested UII. At this point, the external server 108 has all the information required to identify the user device UD which made the request of IP services to the external server 108, so that the external server 108 can provide said requested IP service to the user device UD by exploiting the UII (action block 240).

FIG. 3 shows a swim-lane activity diagram of a method 200 implemented by the EPS system 100 for providing to the external server 108 UII corresponding to a user device UD requesting IP services to the external server 108, according to a second embodiment of the present invention.

According to this embodiment of the present invention, the external server 108 and the PGW module 118 are configured to exchange requests of UII (and the UII itself) by means of additional information that enrich signalling messages over the SGi interface 160 between the AAA server 120 and the PGW module 118 defined in the 3GPP Technical specification TS 29.061, and in the IETF RFC 3588.

The method 300 according to this second embodiment of the present invention provides for the external server 108 sending a request to the PGW module 118 through the AAA server 120.

The method 300 starts at the action block 305, where, in response to a request of IP services to the external server 108 by a specific user device UD attached to the EPS system 100, the external server 108 forwards to the AAA server 120 a UII acquisition request REQ directed to the acquisition of the UII of said user device UD.

The interface between the external server 108 and the PCRF module 125 is out of the scope of the present invention, and could be based on standard protocols, such as HTTP, LDAP, or others. The request REQ comprises:
- a flag A(AAA) to inform the AAA server 120 to operate following a UII request procedure, and
- the IP address IP(UD) of the user device UD that has made the request of IP services.

At the action block 310, the AAA server 120 receives and analyzes the request REQ. In response to the received flag A(AAA), the AAA server 120 forwards a UII acquisition request REQ' to the PGW module 118 (action block 315). The request REQ' comprises:
- a flag A(PGW) to inform the PGW module 118 to operate following a UII request procedure, and
- the IP address IP(UD) of the user device UD that has made the request of IP services.

According to an embodiment of the present invention, the request REQ' is sent by the AAA server 120 in the form of additional information that enriches the RAR messages sent from the AAA server 120 to the PGW module 118 over the SGi interface 160 using the DIAMETER protocol described in IETF RFC 3588.

According to an embodiment of the present invention, specific AVP(s) of the RAR message may be used for the transmission of the flag A(PGW) and/or of the IP address IP(UD). Alternatively, new dedicated AVP(s) of the RAR message can be used.

An exemplary RAR message enriched with the flag A(PGW) and the IP address IP(UD) of the request REQ' according to an embodiment of the present invention is reported hereinbelow, wherein the AVPs corresponding to the enriched portions of the RAR message are marked in bold. In this example, the flag A(PGW) is sent by using the (standard-defined) Event-Trigger AVP, while the IP address IP(UD) is sent by using a new dedicated AVP.

| <RAR> ::= | < Diameter Header: 258, REQ, PXY > |
|---|---|
| | < Session-Id > |
| | { Origin-Host } |
| | { Origin-Realm } |
| | { Destination-Realm } |
| | { Destination-Host } |
| | { Auth-Application-Id } |
| | { Re-Auth-Request-Type } |
| | { Event-Trigger }        –> flag A(PGW) |
| | [ User-Name ] |
| | [ Origin-State-Id ] |
| | [ Proxy-Info ] |
| | [ Route-Record ] |
| | [ AVP ]          –> IP address IP(UD) |

At action block 320, the PGW module 118 receives and analyses the request REQ'.

In response to the received flag A(PGW), the PGW module 118 accesses the database 119 using the IP address IP(UD) as a search key so as to retrieve the UII corresponding to the user device UD that has made the request of IP services (action block 325).

If the requested UII is not stored in the database 119, the PGW module 118 replies with an error message (not illustrated in figure).

If the UII—comprising IP, MSISDN and IMSI—is retrieved from the database 119, the PGW module 118 forwards to the AAA server 120 a response RSP comprising the retrieved UII (action block 330).

According to an embodiment of the present invention, the response RSP is sent by the PGW module 118 in the form of additional information that enriches the Re-Auth-Answer (RAA) messages sent from the PGW module 118 to the AAA server 120 over the SGi interface 160 using the DIAMETER protocol.

According to an embodiment of the present invention, a new dedicated AVP of the RAA message may be used for the transmission of the UII comprised in the response RSP.

An exemplary RAA message enriched with the UII of the response RSP according to an embodiment of the present invention is reported hereinbelow, wherein the AVP corresponding to the enriched portion of the RAA message is marked in bold.

| <RAA> ::= | < Diameter Header: 258, PXY > |
|---|---|
| | < Session-Id > |
| | { Result-Code } |
| | { Origin-Host } |
| | { Origin-Realm } |
| | [ User-Name ] |
| | [ Origin-State-Id ] |
| | [ Error-Message ] |
| | [ Error-Reporting-Host ] |
| | [ Failed-AVP ] |
| | [ Redirect-Host ] |
| | [ Redirect-Host-Usage ] |
| | [ Redirect-Host-Cache-Time ] |
| | [ Proxy-Info ] |
| | [ AVP ]        –> UII(#MSISDN, #IMSI) |

Once the response RSP is received and analysed by the AAA server 120, the AAA server 120 forwards a response RSP' to the external server 108 comprising the retrieved UII (action block 335).

Then, the external server 108 retrieves from the received response RSP' the requested UII. At this point, the external server 108 has all the information required to identify the user device UD which made the request of IP services to the external server 108, so that the external server 108 can provide said requested IP service to the user device UD by exploiting the UII (action block 340).

An alternative of the previously described second embodiment of the present invention provides for the AAA server 120 being configured to send the request REQ' in the form of additional information that enriches messages sent from the AAA server 120 to the PGW module 118 over the SGi interface 160 using the RADIUS protocol described in IETF RFC 3576 during a Change-of-Authorization ("CoA") procedure. The CoA procedure is typically composed of a CoA request message, a CoA-ACK message, or a CoA-NAK message. Each message has the same structure, and in particular has Code numbers and Attributes. The CoA procedure is directed to update (reinitialize authentication and apply new policy) the user attributes of an authentication and authorization session.

According to an embodiment of the present invention, a new Code number can be used for sending the flag A(PGW) (for example the Code number #46) and an Attribute can be used for sending the IP address IP(UD) of the user device UD.

According to this embodiment of the invention, the response RSP sent from the PGW module 118 to the AAA server 120 is sent, as well, in the form of additional information that enriches messages sent over the SGi interface 160 using the RADIUS protocol during a Change-of- Authorization ("CoA") procedure According to an embodiment of the present invention, Code number #47 is used for CoA-ACK having new Attributes for sending the UII comprised in the response RSP. Code number #48 can be used for CoA-NAK.

FIG. 4 shows a swim-lane activity diagram of a method 200 implemented by the EPS system 100 for providing to the external server 108 UII corresponding to a user device UD requesting IP services to the external server 108, according to a third embodiment of the present invention.

According to this embodiment of the present invention, the external server 108 and the PGW module 118 are configured to exchange requests of UII (and the UII itself) by means of additional information that enrich signalling messages over the SGi interface 170 which directly interfaces the external server 108 with the PGW module 118. This SGi interface 170 may be an interface equal to the SGi interface 160 between the AAA server 120 and the PGW 118, defined in the 3GPP Technical specification TS 29.061 and in the IETF RFC 3588.

The method 400 according to this third embodiment of the present invention provides for the external server 108 directly sending a request to the PGW module 118 without exploiting neither the AAA server 120 nor the PCRF module 125.

The method 400 starts at the action block 405, where, in response to a request of IP services to the external server 108 by a specific user device UD attached to the EPS system 100, the external server 108 forwards to the PGW module 118 a UII acquisition request REQ directed to the acquisition of the UII of said user device UD.

The request REQ comprises:
 a flag A(PGW) to inform the PGW module 118 to operate following a UII request procedure, and
 the IP address IP(UD) of the user device UD that has made the request of IP services.

According to an embodiment of the present invention, the request REQ is sent by the external server 108 in the form of additional information that enriches the RAR messages sent from the external server 108 to the PGW module 118 over the SGi interface 170 using the DIAMETER protocol described in IETF RFC 3588.

According to an embodiment of the present invention, new dedicated AVPs of the RAR message can be used for sending the flag A(PGW) and the IP address IP(UD) of the user device UD.

At action block 420, the PGW module 118 receives and analyses the request REQ.

In response to the received flag A(PGW), the PGW module 118 accesses the database 119 using the IP address IP(UD) as a search key so as to retrieve the UII corresponding to the user device UD that has made the request of IP services (action block 425).

If the requested UII is not stored in the database 119, the PGW module 118 replies with an error message (not illustrated in figure).

If the UII—comprising IP, MSISDN and IMSI—is retrieved from the database 119, the PGW module 118 forwards to the external server 108 a response RSP comprising the retrieved UII (action block 430).

According to an embodiment of the present invention, the response RSP is sent by the PGW module 118 in the form of additional information that enriches the Re-Auth-Answer (RAA) messages sent from the PGW module 118 to the external server 108 over the SGi interface 170 using the DIAMETER protocol.

According to an embodiment of the present invention, a new dedicated AVP of the RAA message may be used for the transmission of the UII comprised in the response RSP.

Then, the external server 108 retrieves from the received response RSP the requested UII. At this point, the external server 108 has all the information required to identify the user device UD which made the request of IP services to the external server 108, so that the external server 108 can provide said requested IP service to the user device UD by exploiting the UII (action block 440).

An alternative of the previously described third embodiment of the present invention provides for the external server 108 being configured to send the request REQ in the form of additional information that enriches messages sent from the external server 108 to the PGW module 118 over the SGi interface 170 using the RADIUS protocol during a CoA procedure.

According to an embodiment of the present invention, a new Code number can be used for sending the flag A(PGW) (for example the Code number #46) and an Attribute can be used for sending the IP address IP(UD) of the user device UD.

According to this embodiment of the invention, the response RSP sent from the PGW module 118 to the external server 108 is sent, as well, in the form of additional information that enriches messages sent over the SGi interface 170 using the RADIUS protocol during a Change-of-Authorization ("CoA") procedure According to an embodiment of the present invention, Code number #47 is used for CoA-ACK having new Attributes for sending the UII comprised in the response RSP. Code number #48 can be used for CoA-NAK.

The solutions according to the embodiments of the present invention described above provide for the sending of user identifying information to the external server only when the external server is requesting it. Therefore, compared to the known solutions, which instead trigger the sending of user identifying information to the external server every time a UD is carrying out an attaching procedure (even when the UD is not requesting any service from said external servers), the solutions according to the embodiments of the present invention allow to strongly reduce the signaling traffic. Further the present invention is also able to advantageously avoid or at least reduce data breach occurrences.

Naturally, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof, on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the present invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the EPS has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

Moreover, the modules of the EPS system 100 may be implemented by physical machines, virtual machines running on one or more physical servers, and/or virtual machines in a cloud computing environment.

While in the description reference has been made to an embodiment of the invention in which the external server 108 is able to make direct requests to the PGW module 118 by means of the SGi interface 170, similar considerations apply if a different interface is used.

Moreover, while in the description the UII has been described as comprising IP, MSISDN and IMSI of user devices UD attached to the EPS, similar considerations apply if the UII consists of only the MSISDN and IMSI thereof.

Furthermore, the concepts of the present invention can be also applied in case different user identifying information are considered, such as for example in case the UII includes IP and user device UD information comprising the International Mobile station Equipment Identity ("IMEI"), or also in case the UII comprises only the IMEI.

Furthermore, while in the description reference has been explicitly made to provide the database 119 configured to store the UII at the PGW module 118, the concepts of the present invention can be directly applied to the case in which the database 119 is provided at other section(s)/module(s)/unit(s) of the EPC 105.

Moreover, while in the description reference has been made to an EPS having a 4G/LTE core network, the concepts of the present invention can be also applied to different kinds of architectures, such as for example 2G, 3G and 5G architectures.

Making reference for example to the case in which the EPS system 100 is based on a 5G architecture, the concepts of the present invention can be also applied when:

the PGW module 118 is replaced by a Session Management Function ("SMF") module which, in addition to gateway capabilities to provide connectivity between user devices UD and the external server 108, further provides user session control capabilities (as described in the 3GPP Technical Specification TS 23.501);

the PCRF module 125 is replaced by a Policy Control Function ("PCF") module supporting unified policy framework, providing policy rules to control plane functions, access subscription information for policy decisions in Unified Data Repository ("UDR");

the requests REQ, REQ' and/or the responses RSP, RESP' are sent in the form of additional information that enriches messages sent over the 5G evolutions of the interfaces previously described in the present description, such for example over the interface between the SMF module and the PCF module (presently corresponding to the "NG7 network reference point") and using 5G evolutions of the previously disclosed protocols, such as for example the 5G evolution of the DIAMETER protocol.

The invention claimed is:

1. A method for managing an Evolved Packet System, the Evolved Packet System comprising a core network including a database configured to store User Identifying Information of user devices attached to the Evolved Packet System and at least one external server hosting software applications for providing IP (Internet Protocol) services, the method comprising:

having a user device attached to the Evolved Packet System request IP services to the external server hosting the software applications for providing the IP services;

in response to said requesting IP services, having the external server hosting the software applications for providing the IP services request the User Identifying Information of said user device to the core network;

in response to said requesting the User Identifying Information, having the core network access the database and retrieve the User Identifying Information of said user device;

having the core network send the retrieved User Identifying Information to the external server hosting the software applications for providing the IP services and;

having the external server hosting the software applications for providing the IP services provide the requested IP services to the user device by exploiting said retrieved User Identifying Information.

2. The method of claim 1, wherein:

said requesting the User Identifying Information to the core network comprises requesting said User Identifying Information to a gateway module of the core network configured to provide connectivity between user devices and the external server hosting the software applications for providing the IP services, and said sending the retrieved User Identifying Information to the external server hosting the software applications for providing the IP services comprises having said gateway module send the retrieved User Identifying Information to the external server hosting the software applications for providing the IP services.

3. The method of claim 2, wherein said requesting the User Identifying Information to the gateway module and said sending the retrieved User Identifying Information to the external server hosting the software applications for providing the IP services comprises enriching, with additional information, signaling messages transmitted over interfaces of the Evolved Packet System between said gateway module and the external server hosting the software applications for providing the IP services.

4. The method of claim 3, wherein:

said Evolved Packet System further comprises a policy management module, said requesting the User Identifying Information to the gateway module comprises having the policy management module send a request to the gateway module in the form of additional data enriched signaling messages over a Gx interface, and said sending the retrieved User Identifying Information to the external server hosting the software applications for providing the IP services comprises having the gateway module send a reply to the policy management module in the form of additional data enriched signaling messages over said Gx interface.

5. The method of claim 3, wherein:
said Evolved Packet System further comprises an Authentication, Authorization and Accounting server;
said requesting the User Identifying Information to the gateway module comprises having the Authentication, Authorization, and Accounting server send a request to the gateway module in the form of additional data enriched signaling messages over a SGi interface, and
said sending the retrieved User Identifying Information to the external server hosting the software applications for providing the IP services comprises having the gateway module send a reply to the Authentication, Authorization, and Accounting server in the form of additional data enriched signaling messages over said SGi interface.

6. The method of claim 3, wherein:
said requesting the User Identifying Information to the gateway module comprises having the external server hosting the software applications for providing the IP services send a request to the gateway module in the form of additional data enriched signaling messages over an SGi interface, and
said sending the retrieved User Identifying Information to the external server hosting the software applications for providing the IP services comprises having the gateway module send a reply to the external server hosting the software applications for providing the IP services in the form of additional data enriched signaling messages over said SGi interface.

7. The method of claim 4, wherein:
said sending a request in the form of additional data enriched signaling messages comprises sending said request by enriching, with additional data, Re-Auth-Request messages transmitted using DIAMETER protocol, and
said sending a reply in the form of additional data enriched signaling messages comprises sending said reply by enriching, with additional data, Re-Auth-Answer messages transmitted using DIAMETER protocol.

8. The method of claim 5, wherein:
said sending a request in the form of additional data enriched signaling messages comprises sending said request by enriching, with additional data, Change of Authorization messages transmitted using RADIUS protocol, and
said sending a reply in the form of additional data enriched signaling messages comprises sending said reply by enriching, with additional data, Change of Authorization messages transmitted using RADIUS protocol.

9. The method of claim 1, wherein said core network is based on a selected one among the following architectures:
2G;
3G;
4G/LTE;
5G.

10. The method of claim 1, wherein said User Identifying Information comprises:
MSISDN (Mobile Station International Subscriber Directory Number) and IMSI (International Mobile Subscriber Identity), or
IMEI (International Mobile station Equipment Identity), of said user device.

11. The method of claim 10, wherein said User Identifying Information further comprises an IP address of said user device.

12. A method of providing IP services to a user device attached to an Evolved Packet System, the Evolved Packet System comprising a core network including a database configured to store User Identifying Information of user devices attached to the Evolved Packet System and at least one external server configured to provide IP (Internet Protocol) services, the method comprising:
having the user device attached to the Evolved Packet System request IP services to the external server configured to provide the IP services;
in response to said requesting IP services, having the external server configured to provide the IP services request the User Identifying Information of said user device to the core network;
in response to said requesting the User Identifying Information, having the core network access the database and retrieve the User Identifying Information of said user device;
having the core network send the retrieved User Identifying Information to the external server configured to provide the IP services; and
having the external server configured to provide the IP services provide the requested IP services to the user device by exploiting said retrieved User Identifying Information.

13. An Evolved Packet System, comprising:
a core network formed of a plurality of devices in communication with each other and including at least one processor and a memory that stores User Identifying Information of user devices attached to the Evolved Packet System, and
at least one external server hosting software applications for providing IP (Internet Protocol) services, wherein:
the external server hosting the software applications for providing the IP services is configured to request to the core network the User Identifying Information of a user device attached to the Evolved Packet System that is requesting the IP services to the external server hosting the software applications for providing the IP services;
the at least one processor included in the plurality of devices of the core network is configured to access the memory, retrieve the User Identifying Information of said user device, and send the retrieved User Identifying Information to the external server hosting the software applications for providing the IP services in response to said request; and
the external server hosting the software applications for providing the IP services is further configured to provide the requested IP services to the user device by exploiting said retrieved User Identifying Information.

14. The Evolved Packet System of claim 13, wherein the core network includes a gateway, as one of the plurality of devices, at least one processor of the gateway being configured to provide connectivity between user devices and the external server hosting the software applications for providing the IP services, wherein:
the external server hosting the software applications for providing the IP services is configured to request the User Identifying Information to the gateway, and
the at least one processor of the gateway is configured to send the retrieved User Identifying Information to the external server hosting the software applications for providing the IP services.

15. The Evolved Packet System of claim 14, wherein said memory is located at the gateway module.

* * * * *